United States Patent [19]

Blakely

[11] Patent Number: 4,754,136

[45] Date of Patent: Jun. 28, 1988

[54] METHOD OF DETECTING UNDERGROUND TANK LEAK

[75] Inventor: David A. Blakely, Yorba Linda, Calif.

[73] Assignee: Veral, Ltd., Whittier, Calif.

[21] Appl. No.: 820,438

[22] Filed: Jan. 17, 1986

[51] Int. Cl.⁴ .......................................... G01N 23/222
[52] U.S. Cl. .................... 250/301; 73/49.2; 250/270; 250/391
[58] Field of Search ............ 250/390 C, 301, 270, 250/255, 253, 391; 73/49.2; 376/159, 160, 165

[56] References Cited

U.S. PATENT DOCUMENTS

| | | | |
|---|---|---|---|
| 2,947,870 | 8/1960 | Merritt | 250/255 |
| 3,032,655 | 5/1962 | Romans | 250/338 GA |
| 3,060,315 | 10/1962 | Scherbatskoy | 376/159 |
| 4,523,454 | 6/1985 | Sharp | 73/49.2 |

*Primary Examiner*—Carolyn E. Fields
*Attorney, Agent, or Firm*—Christie, Parker & Hale

[57] ABSTRACT

A non-destructive and non-invasive method of detecting underground tank leaks using three phase testing. A plurality of boreholes are drilled around the tank with the boreholes preferably extending below the tank. In the first phase of testing gas vapor analyzer is used to determine which borehole contains volatile organic material. In the second phase, a neutron back scatter gauge is lowered into those boreholes indicating presence of volatile organic material, and readings are taken at intervals along the length of the borehole. All of the readings are correlated. A sharp increase in reading, over a base reading, detects a probable "leaking" organic material beyond that present in the ambient soil. The third phase of the testing is to identify the probably "leaking" organic material and confirm if it is the same as that contained in the underground tank. A gas chromatograph is used for such purpose in the particular borehole containing "leaking" organic material to identify the volatile material present there. A positive identification would indicate that the "leaking" material is leaking from the tank. In a second embodiment, periodic readings are taken. A change in the vapor concentration gradient is related to rate of leakage from the tank, and volume of leaking material.

9 Claims, 5 Drawing Sheets

METHOD OF DETECTING UNDERGROUND TANK LEAK

BACKGROUND OF THE INVENTION

This invention relates to detecting leakage in underground tanks and conduits using neutron back scatter gauge in combination with gas analysis.

Neutron gauge utilizes a source of fast neutrons and a detector for slow neutrons. Presence of hydrogen-bearing material, such as organic liquid is detected by change in the number of slow neutrons counted in the detector. The number of backscattered slow neutrons is directly related to the number of hydrogen atoms present for slowing the fast neutrons from the source.

In the prior art, neutron detectors have been used in well logging. Examples of these applications are seen in Mills, Jr., U.S. Pat. No. 4,268,749.

There is a need for detecting leaks in underground tanks, particularly tanks that were installed decades ago, using non-destructive and non-invasive method that is at the same time economical and efficient. There is also a need to determine the rate of leak.

SUMMARY OF THE INVENTION

The present method utilizes a plurality of test boreholes drilled around an underground tank, and three-phase testing. In the first phase, gas analysis means is utilized in each borehole to determine which borehole contains volatile organic material. Any borehole that does contain volatile organic material would also contain the organic material in liquid form. Some liquid may be indigenous to the soil. Therefore, the second phase testing is to identify, from among the boreholes containing liquid organic material, those boreholes having ambient liquid in greater quantity than that present in the surrounding soil. For such purposes, a neutron back scatter gauge is lowered into each borehole and readings taken at spaced intervals (say two feet) along the length of each borehole which was found to contain volatile organic material. The readings from each borehole are plotted and correlated to those obtained from the other boreholes. A certain "base reading", present in all boreholes, establishes non-leaking volatile organic material in liquid form present in the ambient soil. A sharp increase at localized depths in particular boreholes establishes presence of what is most likely liquid leaking volatile organic material. In this manner the specific borehole and depth wherein probably "leaking" liquid is present is identified. The third phase of the testing is to confirm that the probably "leaking" liquid is indeed leaking from the tank. For such purpose a gas chromatograph is used to identify the liquid phase volatile organic material in the particular borehole wherein "leaking" liquid was found. If the gas chromatography confirms that the "leaking" liquid in the borehole is the same as that contained in the underground tank, the approximate location and area of the leak would be identified.

In the embodiment, the boreholes of the first embodiment are utilized to determine the leakage flow rate. Here it is assumed that the leaing liquid vapor disperses isotropically throughout the tank containment basin, and, to a large extent be confined within the basin. The vapor concentration in each borehole, or selected boreholes, is measured over a period of time (which may be a few hours, days, weeks or months). The neutron gauge is inserted into the borehole and readings taken at incremental points along the length of the borehole. A change in vapor plume, and liquid levels and concentration profile is related to rate of leakage.

DETAILED DESCRIPTION OF THE DRAWINGS

DETAILED DESCRIPTION OF THE PREFERRED EMBODIMENT

Figure 1:
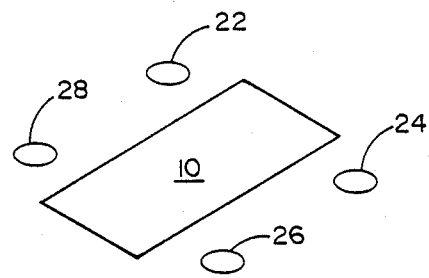
FIG. 1 is a schematic top view of the method of the present invention.
Figure 2:
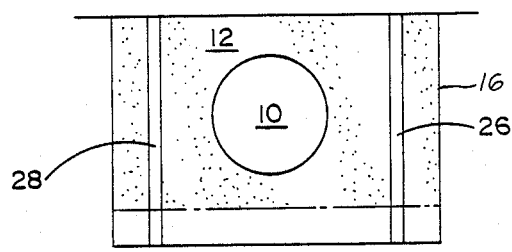
FIG. 2 is a side elevational view of the embodiment of FIG. 1.
Figure 3:
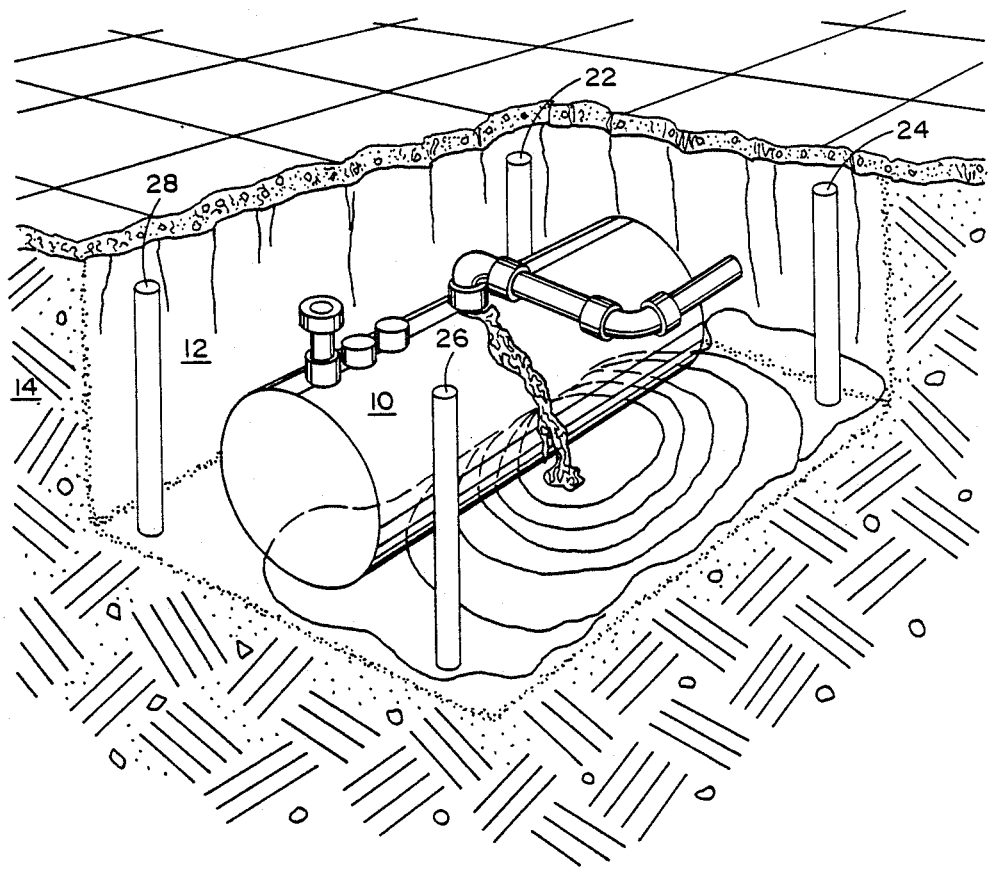
FIG. 3 is a cutaway perspective view of a tank tested by this method.

Referring now to FIG. 1, there is shown a schematic view of one embodiment of the present invention. The figures show an underground tank 10 buried, as is typical, in a containment basin 12 provided in the ground 14. The containment basin 12 is filled with material that may have different compactness, porosity, and material than the surrounding soil, and the interface 16 acts as a boundary wall to substantially contain any leakage from the tank 10 within the containment basin 12. The tank would typically contain organic material, such as gasoline. Typically also, the containment basin 12 extends to a level below the tank 10.

Figure 4:
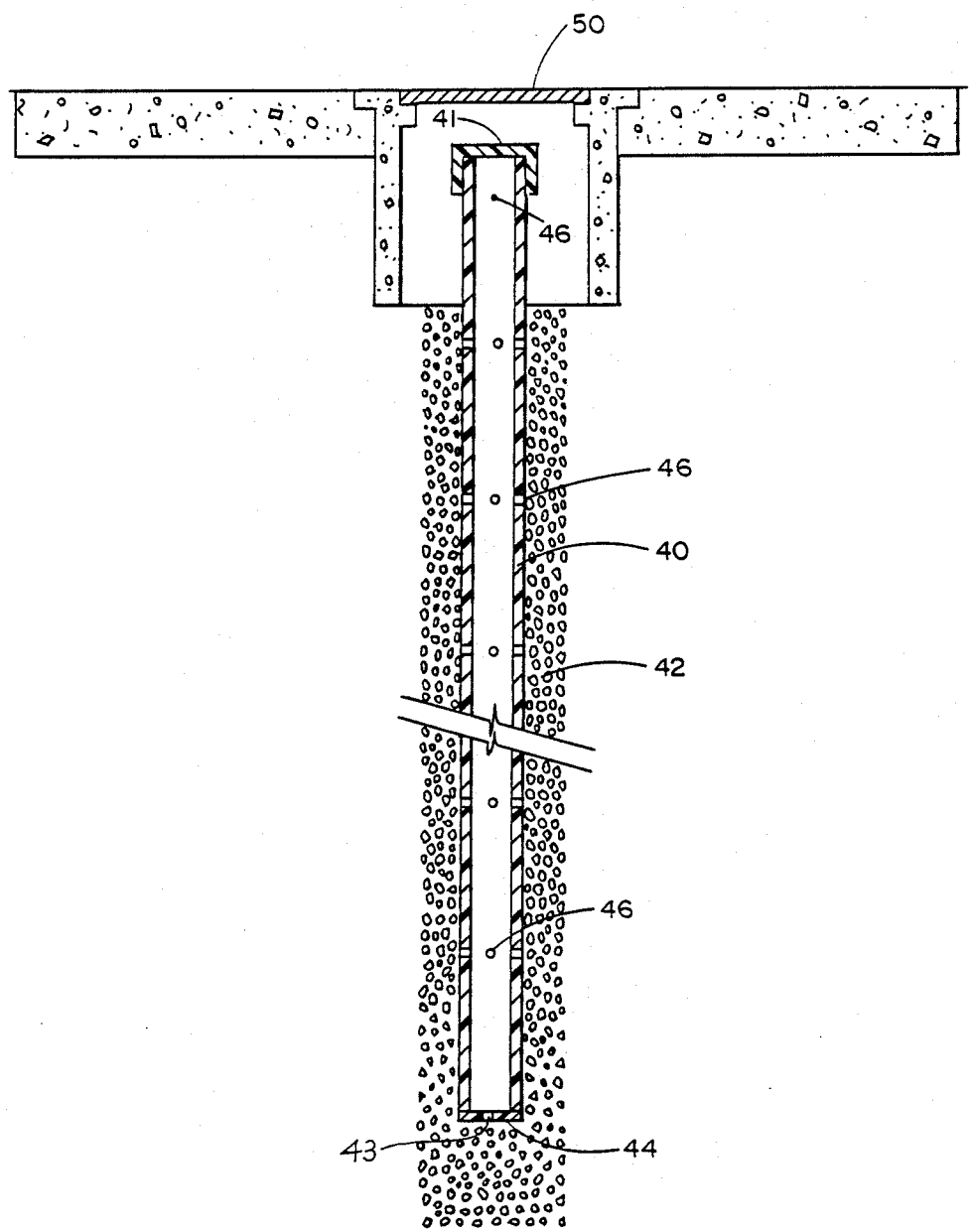
FIG. 4 is a longitudinal sectional view of one test borehole.

FIG. 4 shows one borehole 22 drilled adjacent to a buried tank 10. It is understood that the other test boreholes 24, 26, and 28 would be similar. The borehole is about 6 inches in diameter drilled to a level about four feet below tank level. The distance of the borehole from the tank is selected to avoid any inadvertent contact with the tank during drilling of the borehole.

FIG. 4 shows a sectional view of one test borehole 20. After the borehole is sunk, a 2½" pipe 40 is inserted to act as a protective sleeve. The pipe 40 is approximately centered and supported in the vertical position by pea gravel 42. The pipe may be plugged at the bottom with cap 44 and capped at the top with removable cover 41 and a borehole cap 50 may be provided to preserve the borehole against weather elements.

The pipe 40 is preferably perforated at approximately two foot intervals with ⅜" holes 46. The purpose of the perforations 46 is to allow vapor elements present in the backfill area to seep into and collect in the pipe 40. The pea gravel 42 permits the seepage.

The first embodiment of the present invention preferably utilizes testing in three phases to determine existence of a tank leak. In the first phase, a borehole's volatile gas contents (which have seeped into pipe 40) are evacuated using a pump at the top of the pipe 40; and an organic vapor analyzer is used to determine if volatile organic material is present. The pump may be attached to the vapor analyzer. If the vapor analyzer indicates that volatile organic material is present, the borehole is noted. The first phase testing is conducted in each borehole. It is assumed in the first phase testing that the volatile organic material, if present, is emanating from some liquid organic material also present in the neighborhood of that borehole.

The second phase testing considers those boreholes in which volatile organic material has been detected in the first phase testing. For the second phase, a neutron back scatter gauge is inserted into each one of these boreholes (in which volatile vapors were detected) and test readings taken every two feet. The perforations in the steel pipe permit direct reading of the ambient soil, and any vapor present will seep into the pipe 40. The readings are plotted for each borehole, as shown in FIG. 5.

The zone of testing for a single neutron back scatter gauge reading may be about eight inches. Thus, each reading taken will measure presence of the ambient hydrogen bearing liquid material within an eight-inch range.

The second phase testing takes into consideration that a certain level of soil moisture will provide a certain "base count" reflected in readings taken in each borehole at approximately the same depth. However, presence of leakage from a localized region of the tank 10 will be reflected in a sharp increase in the gauge reading. An estimate of, say 30%, increase in gauge count may be considered as evidence of the presence of an extraordinary, large amount of liquid organic material (or "leaking" fluid), most probably leaking from the underground tank. (Whether or not it is leaking from the underground tank is determined in phase three testing, wherein volatile portions of said "leaking" liquid is specifically identified to conform to that present in the tank.)

Figure 5:
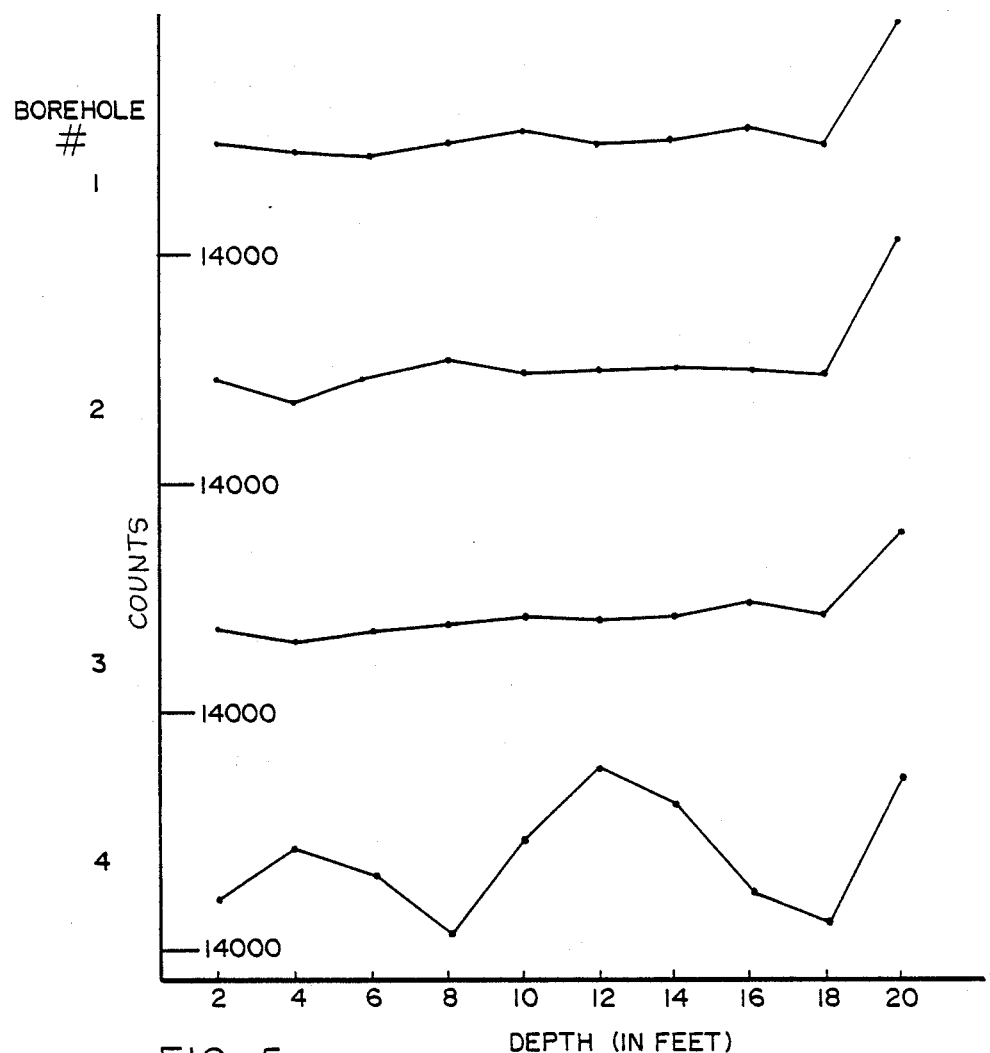
FIG. 5 is a chart of the reading taken by the present method.

The benefit of the chart depicted in FIG. 5 is that the region of the underground where the "leaking" liquid organic material is present is readily apparent. For example in FIG. 5, in borehole #3, the 11 feet to about 15 feet depth region indicates "leaking" liquid organic material is present.

The above second phase testing is usually an immediate indication of tank leak, however it will still indicate only the likelihood" of "leaking" liquid material. It will not identify the organic material, as neutron back scatter alone does not differentiate liquid water from other liquids. Therefore, a third phase testing is required if it is desired to specifically confirm that the "leaking" liquid material is indeed the same as contained in the tank, and therefore leaking from the tank. For the third phase a gas chromatograph (GC) is used in the particular borehole in which "leaking" organic liquid was found in phase two. In the example being considered, a gas chromatograph would be used only in borehole #3. If the GC identification shows positive, i.e., the gas vapor is the same as the organic material contained in the tank, it would confirm that the "leaking" liquid was indeed leaking from the tank. If the GC identification shows negative, i.e., the gas vapor is not the same as the organic material contained in the tank, it would rule out tank leak and indicate pollutants from some other source.

As can be seen, the neutron back scatter gauge, used with the plural testhole, at the same incremental depth in the bore holes effectively localizes and identifies the region that requires gas chromatography testing. In this manner, it is unnecessary to perform gas chromatography tests in boreholes #1, #2 and #4. This saves time, and is efficient.

Prior to utilizing the above method, it is preferable (although not necessary) that the tank be full or at least half-filled to enhance leakage from the tank. Oftentime leaks are small and have occurred over a long period of time.

The method described in FIGS. 1-5 is illustrative only, and many changes may be made therein within the scope of the invention. For example, in FIG. 4 the pipe may be used without perforations 46, and only an opening 43 may be provided in the cap 44. The vapor analyzer would still recognize vapor fumigation entering the borehole at its open end 43. The neutron back scatter gauge would still work and provide the neutron count. Additionally, the pipe may be a steel pipe or a non-metallic pipe.

It can be seen that for an immediate indication of a large pool of contaminant organic material that is more than that present in the ambient soil, the testing of phases one and two may suffice. It is preferable, however, that the third phase testing be performed to provide certainty.

Figure 6:
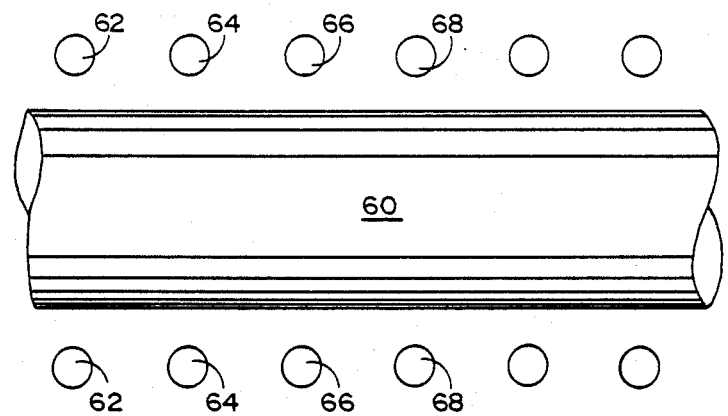
FIG. 6 is a schematic view of the present method utilized with underground conduits.

The above method may be utilized in detection of leakage in an underground conduit. This is shown in FIG. 6. Here, plurality of boreholes are provided on both sides of the conduit and successive boreholes form part of the four boreholes 70 used to develop the chart of FIG. 5. For example, one set may be comprised of holes 62, 62 and 64, 64; second set of 64, 64 and 66, 66; third set of 66, 66 and 68, 68; and so on. The location and depth of "leakage" can be identified, and gas chromatography may be used to further identify the leakage to confirm that it is indeed a leakage from the conduit.

Figure 7:
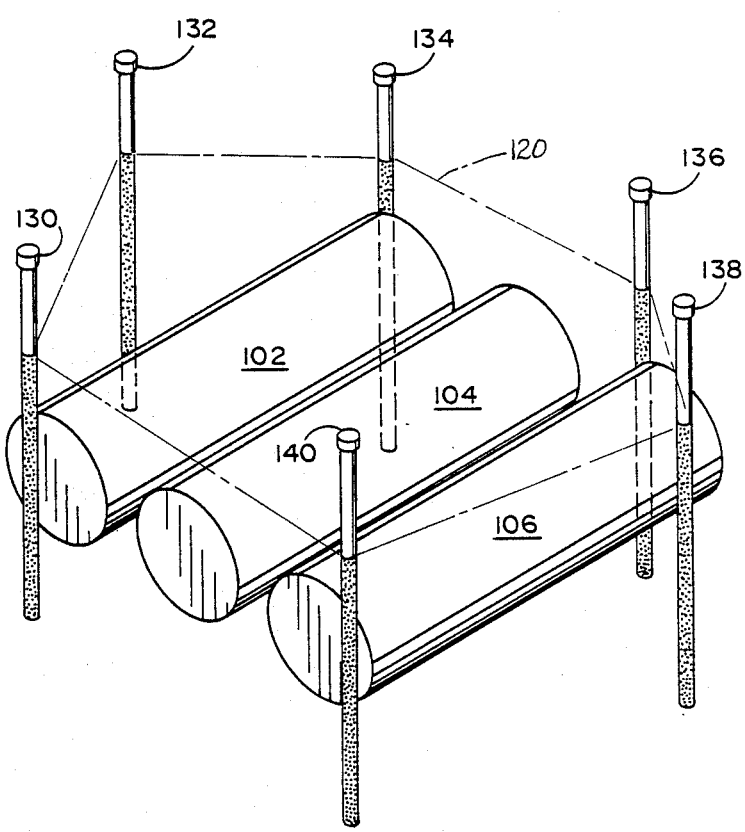
FIG. 7 is an application of the present method to a plurality of underground tanks.

It should be noted that while the description herein has used four boreholes for illustration purposes, this is by no means a limitation of the present invention. We may use only two boreholes, or more than four boreholes. This is shown in FIG. 7.

Figure 8:
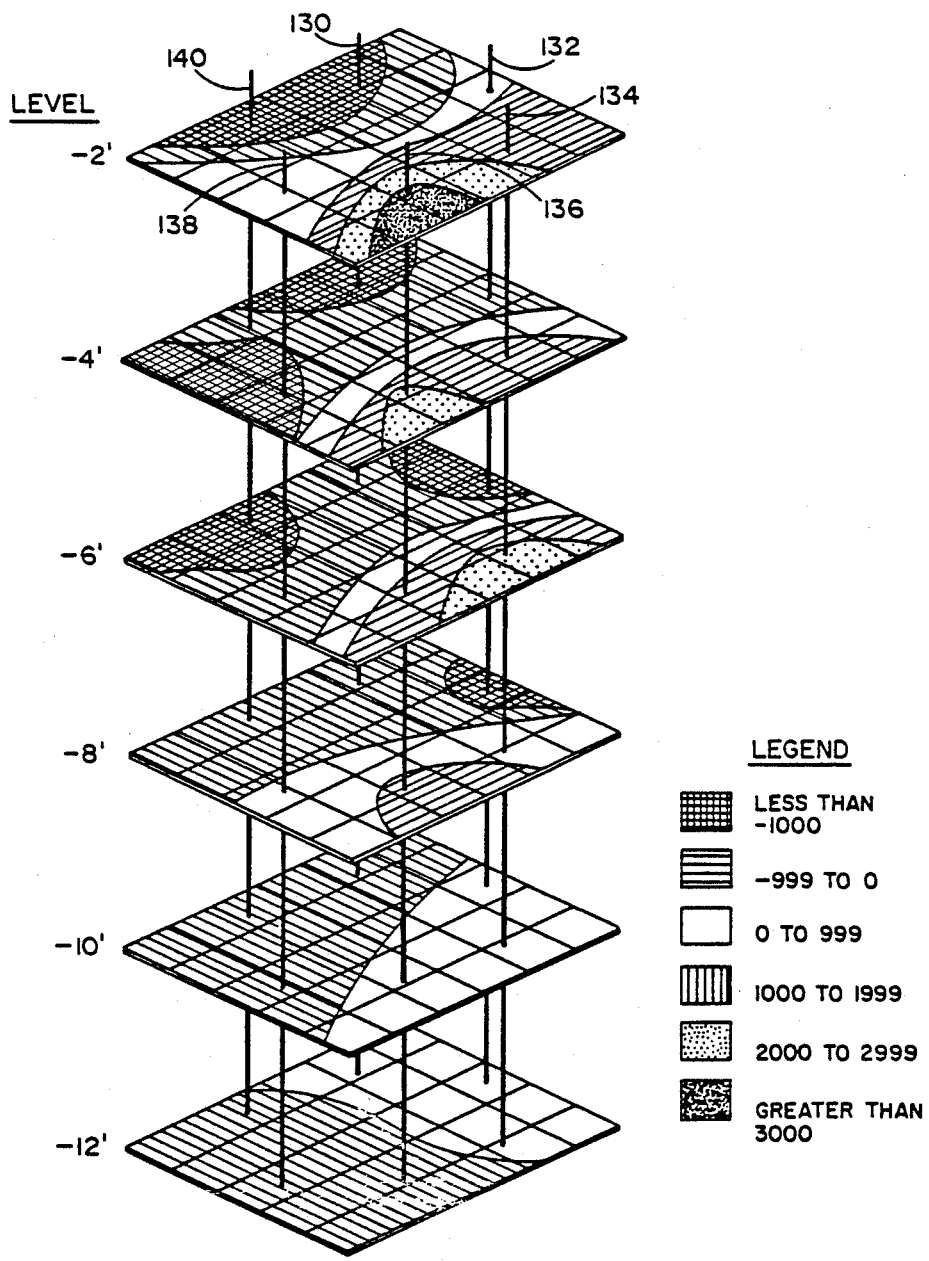
FIG. 8 is a graph showing status of vapor and liquid concentration at different horizontal planes.

In addition to the graph of FIG. 5, the readings obtained may be plotted as a series of horizontal planes showing vapor and liquid concentration levels at that level. For example, FIG. 7 shows an application of the method of the present invention to three underground tanks 102, 104 and 106, below ground level 120 and boreholes 130, 132, 134, 136, 138 and 140. Readings from the neutron gauge are obtained every two feet starting at −2 feet. A representative graph is made showing vapor and liquid concentration at each horizontal plane, as shown in FIG. 8. The graph of FIG. 8 shows presence of pooled liquid between boreholes 134 and 136, but it seems to have dried up at ground levels of −8. It also shows that the concentration increases in a direction away from the location of the tanks (for example, consider the location of boreholes 134, and 136, the tank, and the liquid level profile). This would indicate that the liquid most probably is not leaking from the tanks, but is a pollutant from some other source. In this manner, the integrity of the tank is confirmed.

A second embodiment of the present invention determines the volume of leakage liquid and rate of change of the vapor and liquid concentration in the containment basis. Assuming that the vapor and liquid is leaking from the tank, it will provide an indication of the rate of flow from the leakage, and the volume of liquid within the containment basis. For the second embodiment, it should be noted that leaking liquid proceeds to vaporize from the initial leakage, and dispersion of the vapor throughout the containment basis is rapid, on the order of hours to tens of hours. Thus, very small volumes of liquid can be detected by detecting vapor gradient differential at some point over a period of time.

The vapor concentration proceeds in a ubiquitous manner, and increases to a saturation level for the leaking material's partial pressure. Until the point of saturation, the vapor can be analyzed for source location.

Figure 9:
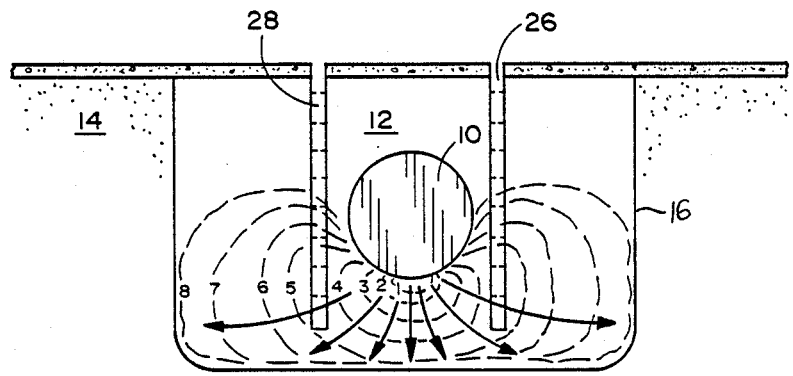
FIG. 9 is a representative diagram of vapor plume formation in underground tank leaks.

The leaking liquid disperses throughout the backfill of the containment basin, by pressure gradient forces and capillary action. FIG. 9 shows representative gradient lines 1-8 from a tank leak. The gravitational force will cause the flow to be biased downwards. The liquid concentration at any point in the containment basin backfill will be a function of its distance from the leakage or area of saturation (100% concentration) and distribution of concentration from the source will be along radial lines from the liquid source, and can be assumed to be nearly uniform (with uniform texture and compactness of the backfill material). It should be considered also that saturation of the backfill by the liquid will be a function of the porosity of the backfill material.

For the second embodiment, test boreholes are drilled adjacent the tanks where the nuclear probe of the neutron back scatter gauge can intersect the lines of transport of the liquid phase. The nuclear instrumentation is calibrated to define the concentration of a liquid based on knowing its hydrogen content. From formulas shown below, the counts of hydrogen are converted to concentration of liquid in suitable dimensions (for example; grams per cubic centimeter). The leak source is first determined from differential liquid concentration registered at all levels in all boreholes, as described earlier.

Vectoral analysis of the concentration values on each horizontal plane provides a resultant line of bearing and the bearing lines intersect within a circle of error that is small relative to the size of the tank, thereby depicting the position of the leak. The volume of liquid is estimated from the integration of the area in each planar segment, as defined at two foot vertical intervals of measurement in the test wells. Integration continues over the vertical extent of indicated liquid distribution to produce an estimate of the total volume of liquid contained within the backfill. Rate of leakage is determined from repeated observations at all locations at intervals of a certain period (may be hours, days, weeks, months). The rate of change of volume over the interval of time provides a direct measurement of leakage rate.

DERIVATIVE BASIS FOR THE CALCULATIONS

For the mathematical basis used in determining volume of contaminant in the region defined by the boreholes, Green's theorem expresses the double integral over a region in terms of an integral around its boundary. If $$\frac{d\phi}{dx}, \frac{dF}{dy} \qquad 1.$$

are continuous within a region R and on its boundary C, then $$\iint_R \left( \frac{d\phi}{dx} - \frac{dF}{dy} \right) dxdy = \int_C (Fdx + \phi dy) \qquad 2.$$

The curvilinear integral on the right is defined as $$\int_0^T \left( F \frac{dx}{dt} + \phi \frac{dy}{dt} \right) dt \qquad 3.$$

where t is a parameter such that as t runs from 0 to T, the point $x=x(t)$, $y=y(t)$ describes the curve once in the positive direction.

A consequence of this theorem is that if $$\frac{d\phi}{dx} = \frac{dF}{dy} \qquad 4.$$

then the curvilinear integral $$\int_{\overline{PQ}} (Fdx + \phi dy) \qquad 5.$$

does not depend on the path of integration but only on the end points P, Q.

(1) IN THE PLANE: Let R be a finite region in the plane and C its boundary. Then the line integral of P dx+Q dy around C in a direction such as to keep the interior of R always on the left is equal to the integral over R of $$\frac{d\phi}{dx} - \frac{dP}{dy} \qquad 6.$$

provided P, Q and these partial derivatives are continuous and single-valued throughout R and C. This is the special case of Stokes' theorem when the surface lies in the x-y plane. While this is the case that applies to the present application, it is pertinent to recognize the calculation is operational in the third dimension.

(2) IN SPACE: Let V be a region of space and S be its boundary. Then the integral of Pdydz+Qdxdz+Rdxdy over S is equal to the integral over V of $$\left( \frac{dP}{dx} + \frac{d\phi}{dy} + \frac{dR}{dz} \right) \qquad 7.$$

provided P, Q, R, and these partial derivatives are single-valued and continuous throughout V and S. In vector notation, with $F=Pi+Qj+Rk$, this is $$\iiint_S F \cdot \gamma dS = \iiint_V \Delta \cdot FdV \qquad 8.$$

where (nu) is the unit vector normal to dS and pointing out of V and (del).F is the divergence of F.

A sufficient restriction on the region R in a plane and on V in space is that R can be divided into a finite number of regions such that the boundary of each region can be divided into two curves $y=f1(x)$ and $y=f2(x)$, and also into two curves $x=g1(y)$ and $x=g2(y)$, where f1, f2, g1 and g2 are continuous and single valued. The conditions for V are analogous.

In application, the assumption is made that the equations are satisfied because the fluid phase of the contaminant moves through the sediment under capillary and pressure gradient forces. Continuity of flow can be assumed thus sufficiently satisfying the analysis.

Areas within each contour on each plane surface are estimated from observations at boreholes and using standard techniques of spatial interpolation. The values are assumed to be uniform through the two foot vertical extent of the layer. Correction for the percent void-space is based on the sediment texture and on the assumption of uniform packing density. Summation over all layers involved in the transport of the material yields the volume at the time of observation.

PRACTICAL APPLICATION

An example of the operation of the method of the present invention may be given using the configuration of six boreholes of FIG. 7. In situ soil analysis is performed at the six boreholes placed every 20 lineal feet immediately adjacent to the perimeter described by the underground tanks complex (3×10,000 gallon tanks, parallel oriented with, say, one foot separation; tank top placed 3 ft. below ground surface, tank bottoms 11 ft. below surface). The boreholes are drilled as follows:

(1) borehole depth 15 ft.
(2) borehole liner—20 ft., 2.5 in. diameter sleeve
   (a) sleeve placement—to borehole bottom approx. 15 ft.
   (b) sleeve material PVC, 3/16 in. wall thickness
   (c) sleeve construction, 4⅛ in. perforations at 2 ft. intervals for the length of the pipe below surface, no perforations in that length of the pipe above surface
   (d) sleeve closure—all sleeves are sealed at bottom and top It should be noted here that for accurate soil analysis single point testing is insufficient as has been clearly demonstrated in laboratory core analysis. Firstly, no conditions which are a rate of multiple retesting at the same test point over a given period of time. Pollutants are not static, but rather dynamic as they occur in the Vadose Zone. Rate of flow and gradient direction with subsequent mapping projections can only be determined by repetitive analysis. Secondly, excavating and removal of soil for off site laboratory analysis induces gross error in the analysis process which renders quantification virtually impossible especially when attempting vapor measurements.

In preparation for testing,
(1) Vapors in each test well were qualitatively analyzed by insertion of a 3 ft. vacuum probe. Sampling was conducted until flameout occurred. Note: all wells were sealed until such testing was conducted, allowing complete evaporation of Chevron solvent 350B (90% evaporation time is 3 hrs. 13 min., evapograph at 80° F.) The test wells were in place for one week and two days (216 hrs.) prior to vapor analysis.

Testing was performed in boreholes at four different time periods utilizing a portable neutron activation probe sensitivity level of 5 ml per kilogram (sand) (Note: the soil was sand). Such sensitivity is approximately equivalent to 5 ppm (parts per million).

The following data was obtained using the neutron gauge:

TEST RESULT AT PERIOD $T_1$

| Depth | Well # 1 | 2 | 3 | 4 | 5 | 6 |
|---|---|---|---|---|---|---|
| −2 | 6929 | 9859 | 8184 | 10970 | 8413 | 6708 |
| −4 | 7316 | 7808 | 10630 | 10337 | 6809 | 8173 |
| −6 | 8103 | 6687 | 10640 | 9592 | 8321 | 7242 |
| − | 8744 | 7985 | 9060 | 12386 | 10375 | 8130 |
| −10 | 8388 | 9231 | 7779 | 7881 | 7487 | 7752 |
| −12 | 8268 | 10387 | 9241 | 8337 | 7921 | 7471 |
| −14 | 11480 | 12004 | 10743 | 8109 | 7104 | 7018 |

TEST RESULT AT PERIOD $T_2$

| Depth | Well # 1 | 2 | 3 | 4 | 5 | 6 |
|---|---|---|---|---|---|---|
| −2 | 7441 | 8596 | 10983 | 12557 | 9487 | 7536 |
| −4 | 7171 | 7835 | 8630 | 11293 | 7765 | 7579 |
| −6 | 8009 | 7612 | 11179 | 10628 | 7308 | 7637 |
| −8 | 8678 | 6946 | 9546 | 9202 | 8054 | 8311 |
| −10 | 8294 | 8537 | 9083 | 9918 | 8452 | 7786 |
| −12 | 8229 | 8478 | 8824 | 8202 | 7776 | 8573 |
| −14 | 12090 | 12297 | 8994 | 8282 | 7327 | 7679 |

TEST RESULTS IN TIME PERIOD $T_3$

| Depth | Well # 1 | 2 | 3 | 4 | 5 | 6 |
|---|---|---|---|---|---|---|
| −2 | 6916 | 8546 | 11065 | 12788 | 9464 | 7444 |
| −4 | 7451 | 7916 | 8592 | 11346 | 7630 | 7489 |
| −6 | 7410 | 7751 | 11254 | 10588 | 7217 | 7717 |
| −8 | 8662 | 8042 | 9430 | 9191 | 7576 | 8674 |
| −10 | 8510 | 8318 | 9194 | 9626 | 8498 | 7762 |
| −12 | 10743 | 8522 | 8760 | 7862 | 7829 | 8553 |
| −14 | 8419 | 11878 | 9161 | 8229 | 7311 | 7710 |

TEST RESULTS IN TIME PERIOD $T_4$

| Depth | Well # 1 | 2 | 3 | 4 | 5 | 6 |
|---|---|---|---|---|---|---|
| −2 | 8621 | 11564 | 11861 | 14887 | 12614 | 10685 |
| −4 | 7483 | 8782 | 10738 | 14735 | 10216 | 7766 |
| −6 | 7502 | 7732 | 11871 | 13435 | 7341 | 7459 |
| −8 | 8638 | 6952 | 9591 | 12426 | 8109 | 8572 |
| −10 | 8271 | 8474 | 9279 | 14095 | 8532 | 7886 |
| −12 | 10635 | 8889 | 9069 | 9087 | 7784 | 8557 |
| −14 | 13103 | 11517 | 9134 | 8177 | 7271 | 7473 |

Vapor Analysis — Pollutant (Chevron 350B) liquid volume =

$$\frac{\text{(Concentration (ppm) (Mole Wt.) (System Volume)}}{\text{(Density) (Molar Volume)}}$$

given:
System volume—14 ft. well×2.5 in. dia.=35,500 ml
Mole Wt. (Chevron 350B)=142 gm/mole
Density (Chevron 350B)=0.79 gm/ml
Molar Volume (Chevron 350B) at 58° F.=23.6 L/mole let X=parts observed during in situ survey, then:

$$\text{liquid volume} = \frac{(X)\,(142\text{ am/mole})\,(35.5\text{ L})}{(.79\text{ gm/ml})\,23.6\text{ L/mole}}$$

Which equals the following where X is listed for each borehole:

| Borehole # | X | Pollutant Volume (liquid) |
| --- | --- | --- |
| 1 | 240 | 64.8 ul or .003 fl oz |
| 2 | <10 | <2.7 ul or .000 fl oz |
| 3 | <10 | <2.7 ul or .000 fl oz |
| 4 | 420 | 113.4 ul or .005 fl oz |
| 5 | 220 | 59.4 ul or .003 fl oz |
| 6 | 110 | 29.7 ul or .001 fl oz |

Neutron Activation (liquid anomalies):

| Borehole # | Depth in ft.(all units below are gm/cubic cm) | | | | | |
| --- | --- | --- | --- | --- | --- | --- |
|  | −2 | −4 | −6 | −8 | −10 | −12 |
| 1 | 0 | 0 | 0 | 0 | 0 | .04 |
| 2 | .05 | 0 | 0 | 0 | 0 | .02 |
| 3 | .09 | .05 | .14 | .04 | 0 | .01 |
| 4 | .17 | .12 | .08 | .08 | .02 | 0 |
| 5 | .03 | 0 | 0 | 0 | 0 | 0 |
| 6 | 0 | 0 | 0 | 0 | 0 | 0 |

ANALYSIS OF THE DATA

The above four sets of readings of the neutron probe may be readily converted to mg. of hydrogen-bearing material to kg of soil from charts provided by the manufacturers of the neutron gauge. The readings immediately show the variations and shift of hydrogenous material around the area of survey. Additionally, the readings of the neutron gauge stated above were then averaged at each two foot plane to obtain a ground mean for each level. The ground mean profile has a minimum value at the 8–10 foot region which represents the background value. Profiles of moisture content are strikingly similar in character independent of geographical location. Near the ground surface it is maximum and decreases to minimum concentration 6 to 10 feet, after which a gradual increase may occur. Thus the analysis of the data obtained was based on the anomaly from background; allowance for local conditions may thereby be introduced to the analysis and interpretation.

Anomaly analysis is based on the mean variation over the four time periods from the mean background values:

$$\bar{x}_n - \bar{x}_i$$

where $\bar{x}_n$ is the mean value of all measurement at the nth level in well number i. The anomaly values of moisture content of the surrounding backfills was contoured in dimensions of counts relative to the base level of 10 feet. Counts represent the concentration of hydrogen atoms in the material (contaminants) dispersed through the sand backfill. Since the hydrogen component varies in hydrocarbon or water, the same count may represent a different concentration of material dependent on its concentration. In the case of water, one thousand counts would represent approximately a concentration of 0.1 gm/km$^3$. Hydrocarbons which are more heavily based on hydrogen, will have a lower concentration for the same count; in this case one thousand counts would represent about 0.49 gm/cm$^3$ solvent.

The data obtained was represented by the graph of FIG. 8. The graph shows that slight surface residue of contaminants do not reach below the six feet level. (If tank leak occurred, the contaminants would migrate down, ultimately to the water table.) The diagram demonstrates also that the high concentration of contaminants increases away from the tank, toward the loading area (borehole well #4) rather than toward the body of the tank as it would if the source of the contaminant were associated with the tanks.

In the above application, gas chromatography readings from the boreholes compared with the tank contents showed that the soil contained only solvent, not gasoline, thereby eliminating the adjacent fuel tank as a source of the contaminants in the portion of the region surveyed.

The very small quantity of solvent in the surface was found to be stable and of too low concentration to be of concern, especially since it has not migrated to the water table.

Vapor analysis performed in each test well indicates no hydrocarbon presence in the test area greater than 0.1 milliliter. In situ chromatographic analysis was performed in-tank and in the test well where 0.1 ml of hydrocarbon was observed (borehole #136). Such quantitative analysis indicated Chevron 350B vapors were the hydrocarbon present in this borehole well. Neutron activation testing in this borehole well indicated 80 gms/kilogram at mid tank level to 20 gms/kilogram at bottom tank level to 0 gms/kilogram at 2 ft. below tank bottom level. Subsequent retesting (neutron activation) of borehole #136 indicated up to 40% decrease in liquid anomalies at −4 ft. and −6 ft. indicating surface spillage in this area with gradual dissipation of the pollutant occurring.

Contour analysis of subsurface liquid activity indicates no presence of Chevron 350B at mid tank level (−6 ft.) and below. There was very limited surface contamination and resulting sub-surface pollutants; less than 0.005 oz discovered. Therefore, the three (3) 10,000 gal. Chevron 350B underground storage tanks were intact.

What is claimed is:

1. A method of detecting underground tank leaks wherein the tank contains organic fluid comprising:
   (a) providing a plurality of spaced-apart boreholes in the ground adjacent said tank;
   (b) providing gas analysis means in each borehole for determining presence of volatile organic material;
   (c) providing a neutron activation gauge in boreholes found in step (b) to contain volatile organic material;
   (d) activating said gauge at spaced intervals along the length of said borehole and obtaining readings;
   (e) correlating the readings obtained in step (d) to each other to detect indices of probable tank leak and;
   (f) correlating the readings obtained in step (d) to each other for identifying particular borehole or boreholes indicating location of said probable tank leak.

2. The method of claim 1 further including providing gas identification means in a particular borehole indicating presence of probable tank leak for identifying the organic material.

3. The method of claim 1, further including
   (g) periodically providing gas analysis means in each borehole for determining presence of volatile organic material;
   (h) providing a neutron activation gauge in boreholes found in step (g) to contain volatile organic material;
   (i) activating said gauge at spaced intervals along the length of said boreholes for determining location and concentration of volatile organic material; and (j) correlating the readings obtained in step (i) at each time period to other time periods for determining rate of said probable tank leak.

4. A method of determining rate of leakage in an underground tank leaking organic material forming vapors in the soil adjacent the tank comprising
   (a) providing a plurality of spaced apart boreholes in the ground adjacent said tank;
   (b) providing gas analysis means in each borehole for determining presence of volatile organic material;
   (c) providing a neutron activation gauge in boreholes found in a step (b) to contain volatile organic material;
   (d) activating said gauge at spaced intervals along the length of said borehole, and obtaining readings;
   (e) repeating steps (c) and (d) periodically; and
   (f) correlating the readings for determining rate of leak.

5. The method of claim 4 wherein the boreholes extend below the level of the tank.

6. A method of detecting underground tank leaks, comprising the steps of:
   (a) providing a plurality of spaced-apart boreholes in the ground adjacent and around said tank;
   (b) providing a neutron activation gauge in said boreholes;
   (c) activating said gauge at spaced intervals along the length of each of said boreholes for reading detection of hydrocarbon material;
   (d) correlating the readings obtained in step (c) to each other to detect indices of a tank leak; and
   (e) utilizing gas chromatography in at least one of said boreholes indicating presence of leakage to identify volatile organic material therein.

7. The method of claim 6 wherein the boreholes extend below the tank.

8. The method of claim 6 wherein said correlating comprises establishing a base reading of said gauge indicating presence of non-leaking volatile organic material, and establishing a certain ratio above said base reading as indices of leaking volatile organic material.

9. The method of claim 6 wherein gas chromatography is utilized in all of the boreholes indicating presence of leakage to identify the volatile organic material therein.

* * * * *